(12) United States Patent
Panzer et al.

(10) Patent No.: US 11,440,223 B2
(45) Date of Patent: Sep. 13, 2022

(54) STATIC LIQUID INTERFACE PRODUCTION OF LENSES AND OTHER CONTOURED OBJECTS

(71) Applicant: Carbon, Inc., Redwood City, CA (US)

(72) Inventors: Matthew Panzer, Redwood City, CA (US); John R. Tumbleston, Menlo Park, CA (US)

(73) Assignee: Carbon, Inc., Redwood City, CA (US)

( * ) Notice: Subject to any disclaimer, the term of this patent is extended or adjusted under 35 U.S.C. 154(b) by 423 days.

(21) Appl. No.: 16/526,071

(22) Filed: Jul. 30, 2019

(65) Prior Publication Data

US 2020/0039118 A1 Feb. 6, 2020

Related U.S. Application Data

(60) Provisional application No. 62/712,544, filed on Jul. 31, 2018.

(51) Int. Cl.
*B29C 35/02* (2006.01)
*B29C 35/08* (2006.01)
*B29D 11/00* (2006.01)

(52) U.S. Cl.
CPC ...... *B29C 35/0288* (2013.01); *B29C 35/0805* (2013.01); *B29D 11/00365* (2013.01); *B29C 2035/0827* (2013.01)

(58) Field of Classification Search
CPC .................................................. B29C 64/124
See application file for complete search history.

(56) References Cited

U.S. PATENT DOCUMENTS

| | | | | |
|---|---|---|---|---|
| 6,001,297 | A | * 12/1999 | Partanen | B29C 64/135 264/401 |
| 2015/0276987 | A1 | * 10/2015 | McKenzie | B33Y 80/00 427/10 |
| 2015/0277146 | A1 | * 10/2015 | Crespo | B29D 11/00951 264/1.36 |
| 2017/0113416 | A1 | * 4/2017 | DeSimone | B33Y 30/00 |

(Continued)

FOREIGN PATENT DOCUMENTS

WO WO-2019021451 A1 * 1/2019 .......... C08F 222/102

*Primary Examiner* — Niki Bakhtiari
*Assistant Examiner* — Inja Song
(74) *Attorney, Agent, or Firm* — Myers Bigel, P.A.

(57) ABSTRACT

An apparatus useful for rapidly producing at least one object having a contoured surface portion from a light-polymerizable resin is provided. The apparatus includes (a) a window containing an inhibitor of polymerization, on which window a coating of light polymerizable resin can be placed, with the inhibitor of polymerization forming a first dead zone of unpolymerizable resin in the light polymerizable resin; (b) a polymerizing light source operatively associated with the window and positioned for projecting polymerizing light through the window; (c) a controller operatively associated with said light source and configured to pattern and project said polymerizing light at a first light dosage sufficient to form the object in the resin under stationary conditions, while spatially modulating the first light dosage so that the first dead zone is spatially contoured in thickness, to produce a first contoured surface portion on each object, which first contoured surface portion is in contact with the first dead zone of unpolymerizable resin.

16 Claims, 6 Drawing Sheets

(56) References Cited

U.S. PATENT DOCUMENTS

2018/0001581 A1\* 1/2018 Patel ................... G02C 7/04
2018/0081198 A1\* 3/2018 Widman ................ G03F 7/24
2019/0322033 A1\* 10/2019 Willis ................ B29C 64/124

\* cited by examiner

STATIC LIQUID INTERFACE PRODUCTION OF LENSES AND OTHER CONTOURED OBJECTS

RELATED APPLICATIONS

This applications claims priority to U.S. Provisional Application Ser. No. 62/712,544, filed Jul. 31, 2018, the disclosure of which is hereby incorporated by reference in its entirety.

FIELD OF THE INVENTION

The present inventions concerns methods of making contoured objects such as lenses by additive manufacturing.

BACKGROUND

Lenses such as intraocular lenses are generally made by techniques such as casting (see, for example, K. Sarbadhikari, Intraocular Lens Manufacturing Process, U.S. Pat. No. 6,391,230 (Bausch & Lomb). The requirement for molds in such techniques can slow the manufacturing process, particularly where large numbers of lenses must be produced, or molds must be cleaned for re-use.

A more rapid manufacturing technique is described in D. Dendukuri et al., *Continuous-flow lithography for high-throughput microparticle synthesis*, Nature Materials 5, 365-368 (May 2006) and Doyle et al., U.S. Pat. No. 7,709,544, but this technique is not well adapted to the production of contoured objects such as lenses that are contoured or curved in three dimensions (see also D. Dendukuri et al., *Stop-flow lithography in a microfluidic device*, The Royal Society of Chemistry, Lab on a Chip 7, 818-828 (2007); D. Dendukuri et al., *Modeling of Oxygen-Inhibited Free Radical Photopolymerization in a PDMS Microfluidic Device*, Macromolecules, 41: 8547-8556 (2008); D. Dendukuri and P. Doyle, *The synthesis and assembly of polymeric microparticles using microfluidics*, Adv. Mater. 21, 4071-4086 (2009); S. Suh et al., *Using Stop-Flow Lithography to produce opaque microparticles: Synthesis and modeling*, Langmuir 27, 13813-13819 (2011); H. An et al., *Synthesis of colloidal microgels using oxygen-controlled flow lithography*, Soft Matter 10, 7595 (2014)).

A recent innovation in bottom-up stereolithography known as continuous liquid interface production or "CLIP" allows more rapid production of contoured objects, but generally requires that the objects be adhered to a moving carrier plate (or static carrier plate facing a moving window) during their production (See J. Tumbleston, D. Shirvanyants, N. Ermoshkin et al., Continuous liquid interface production of 3D Objects, *Science* 347, 1349-1352 (published online 16 Mar. 2015); see also U.S. Pat. Nos. 9,211,678; 9,205,601; and 9,216,546 to DeSimone et al.).

Accordingly, there is a need for new apparatus and methods for the manufacture of contoured articles such as lenses, particularly small lenses such as intraocular lenses, ophthalmic contact lenses, and microlenses (e.g., as used in digital cameras and other opto-electronic devices).

SUMMARY

In some embodiments, an apparatus useful for rapidly producing at least one object having a contoured surface portion from a light-polymerizable resin is provided. The apparatus includes (a) a window containing an inhibitor of polymerization, on which window a coating of light polymerizable resin can be placed, with the inhibitor of polymerization forming a first dead zone of unpolymerizable resin in the light polymerizable resin; (b) a polymerizing light source operatively associated with the window and positioned for projecting polymerizing light through the window; (c) a controller operatively associated with said light source and configured to pattern and project said polymerizing light at a first light dosage sufficient to form the object in the resin under stationary conditions, while spatially modulating the first light dosage so that the first dead zone is spatially contoured in thickness, to produce a first contoured surface portion on each object, which first contoured surface portion is in contact with the first dead zone of unpolymerizable resin.

In some embodiments, the inhibitor of polymerization comprises oxygen. In some embodiments, the window comprises a fluoropolymer.

In some embodiments, a substrate faces the window, and the substrate is configured for producing an object adhered thereto.

In some embodiments, the window is a first window, and the apparatus includes a second window facing the first window and configured for contacting said light polymerizable resin, and the second window contains an inhibitor of polymerization. In some embodiments, the inhibitor comprises oxygen. In some embodiments, the second window comprises a fluoropolymer. In some embodiments, the apparatus includes a second polymerizing light source operatively associated with the second window and positioned for projecting polymerizing light through the second window.

In some embodiments, the first window, and optionally the second window, comprises a light responsive polymer layer configured for contacting the polymerizable resin layer.

In some embodiments, the apparatus includes a probe light source configured for projecting probe light through the object; and a detector configured for detecting probe light having passed through the object. The controller is configured to modify the polymerization light in response to deviations in the probe light from that expected to be imparted to the detector on passing through the object to correct potential distortions in the object.

In some embodiments, a method of rapidly producing at least one object having a contoured surface portion includes (a) providing a window containing an inhibitor of polymerization, (b) coating the window with a light-polymerizable resin under conditions in which the inhibitor passes into a portion of the resin and thereby forms a first dead zone of unpolymerizable resin contacting the window; and (c) exposing the resin to patterned polymerizing light through the window at a light dosage sufficient to form the object in the resin under stationary conditions, while (d) spatially modulating the first light dosage so that the first dead zone is spatially contoured in thickness to produce a first contoured surface portion on each object, which first contoured surface portion is in contact with said first dead zone of unpolymerizable resin.

In some embodiments, the method includes contacting a substrate to the resin facing the window; and producing the objects adhered to the substrate while the substrate and the window remain stationary; and then separating the objects from the substrate (for example, which substrate can have a planar resin contact surface, or a contoured resin contact surface, e.g., to mold the opposing surface of the object).

In some embodiments, the window is a first window, and the method includes contacting a second window to the resin in a position opposing the first window, the second window containing an inhibitor of polymerization, under conditions in which the inhibitor passes into a portion of the resin and forms a second dead zone of unpolymerizable resin contacting the second window; and further exposing the resin to patterned polymerizing light through the second window at a second light dosage sufficient to further form the object in the resin under stationary conditions; while spatially modulating the second light dosage so that the second dead zone is spatially contoured in thickness to produce a second contoured surface portion on the object, which second contoured surface portion is in contact with the second dead zone of unpolymerizable resin.

In some embodiments, each of the exposing step(s) are carried out with: (i) a single pulse of patterned polymerizing light, which pulse is spatially modulated in intensity, duration, or a combination thereof; or (ii) a plurality of pulses of patterned polymerizing light, which pulses are spatially modulated in intensity, duration, frequency, or a combination thereof; (iii) a focused beam of polymerizing light (for example, which focused beam is focused on an edge portion of object during production thereof).

In some embodiments, the first window, and optionally the second window, comprises a light responsive polymer layer contacting said polymerizable resin layer, and optionally wherein the method further comprises exposing each the light responsive polymer layer to patterned controlling light to selectively contour the surface thereof.

In some embodiments, the method further comprises exposing the object to probe light during said exposing step (c); detecting the probe light after having passed through said object; and modifying the polymerization light in response to deviations in the probe light from that expected to be imparted to the detector on passing through the object to correct potential distortions in said object during the exposing step (c).

In some embodiments, the first window, and said second window when present, comprises an oxygen-permeable polymer (e.g., a fluoropolymer).

In some embodiments, the at least one object comprises a plurality of separate objects produced concurrently with one another.

In some embodiments, each of the object(s) comprises a lens (e.g., an individual lens such as an ophthalmic contact lens or intraocular lens, a lens array; an individual microlens, a microlens array, etc.).

In some embodiments, each of the object(s) comprises an optically transparent (and in some embodiments visually transparent) polymer.

The foregoing and other objects and aspects of the present invention are explained in greater detail in the drawings herein and the specification set forth below. The disclosures of all United States patent references cited herein are to be incorporated herein by reference.

RELATED APPLICATIONS

Figure 1:
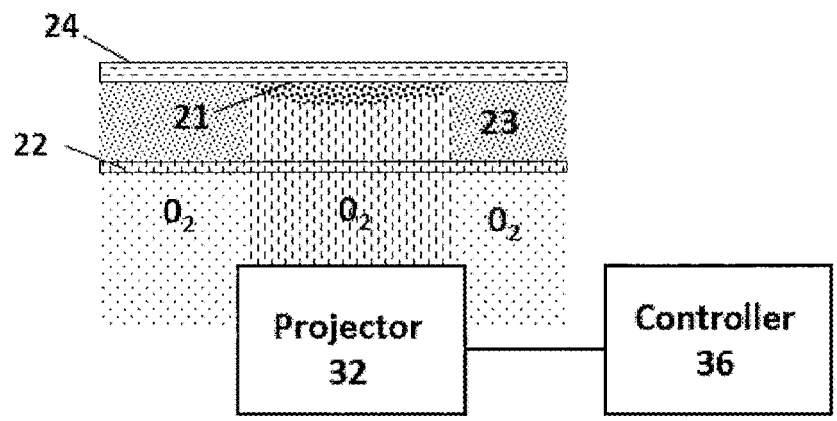
FIG. 1 schematically illustrates a first embodiment of an apparatus and method of the present invention FIG. 2 schematically illustrates a first embodiment of a process of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

FIG. 1 schematically illustrate a first embodiment of an apparatus and method of the present invention. The apparatus includes an oxygen-permeable window or build plate 22 (such as a fluoropolymer film, optionally supported by a rigidifying base such as a glass plate) and a stationary carrier or substrate 24, between which a light polymerizable 23 resin is placed, which resin provides liquid contact between the window and the carrier. A light source or projector 32 (such as a UV light source operatively associated with a micromirror array) is operatively associated with a controller 36, and is positioned to project light through the window and into the window. The carrier, window, projector, and controller can (in some embodiments) be as described in DeSimone et al., U.S. Pat. No. 9,205,601 (the disclosure of which is incorporated herein by reference), though all operated in a static manner, and not with advancing of the window and carrier away from one another during production of the object. Indeed, the present invention can be carried out on a modified version of a Carbon Inc. M1 or M2 printer (available from Carbon Inc., 1089 Mills Way, Redwood City, Calif. 94063 USA), modified to produce the object statically, without motion of the carrier and window away from one another, as discussed further below.

The amount of oxygen delivered through the window can be varied (as discussed further below), by any suitable technique, including but not limited to those described in B. Feller et al., PCT Patent Application Publication Nos. WO2018/006029 and WO2018/006018.

Figure 2:
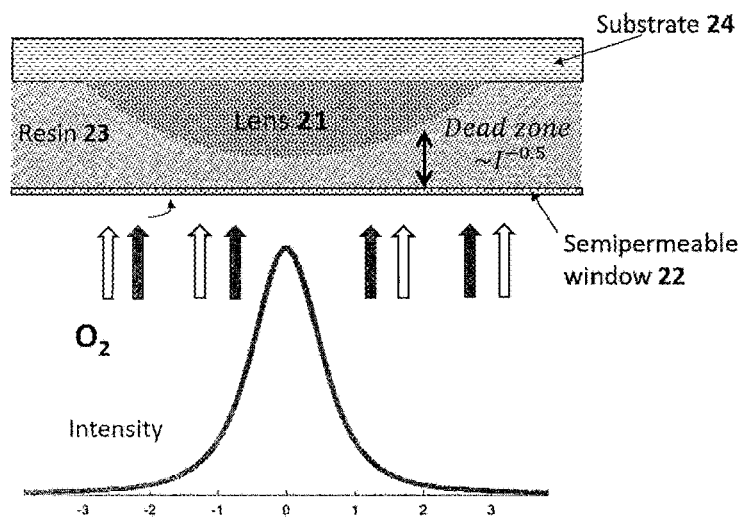

FIG. 2 further illustrates a process of the invention, where filled arrows represent light, and open arrows represent oxygen flow. By modulating the intensity of the light projected through the oxygen permeable window 22 into the resin, the dead zone is selectively depleted in regions of greatest light intensity, and more extensive polymerization of the object occurs in the vertical (or "Z") direction, allowing (in the illustrated embodiment) a curved or arc shape to be formed, on the object 21 (in the illustrated embodiment, a lens) which is in turn adhered to the substrate 24.

Figure 3:
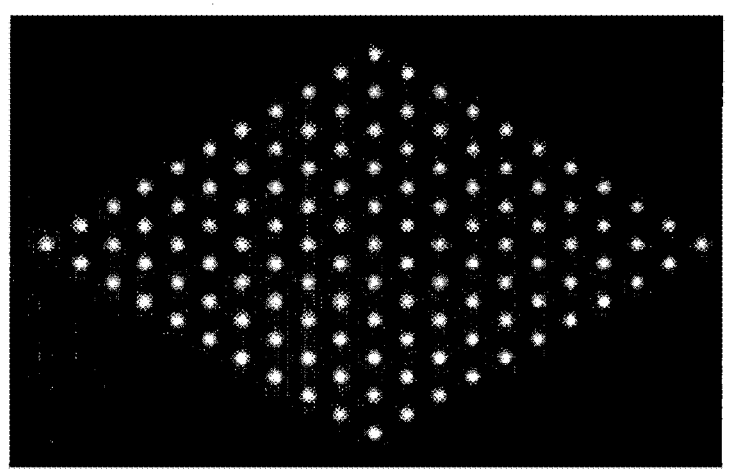
FIG. 3 is a photograph of a single pulse (.png) light dose for producing a microlens array of the present invention.

Indeed, in some embodiments, the entire production of the object may be accomplished by delivering a single pulse light of light (for example, a single .png file). FIG. 3 is a photograph of a single light pulse (projected against a screen) for producing a microlens array in accordance with a process of the present invention, and FIG. 4 is a photograph of a portion of such a microlens array, produced from WHIP MIX "Surgical Guide for Carbon Printers 71079-C" resin, available from Whip Mix Corp., 361 Farmington Ave., Louisville, Ky. 40209 USA.

Figure 4:
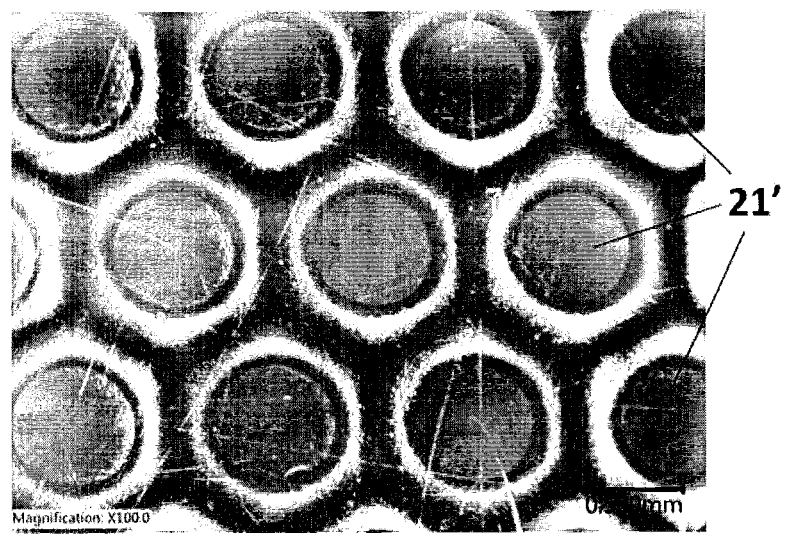
FIG. 4 is a photograph of a microlens array produced by a process of the present invention.
Figure 5:
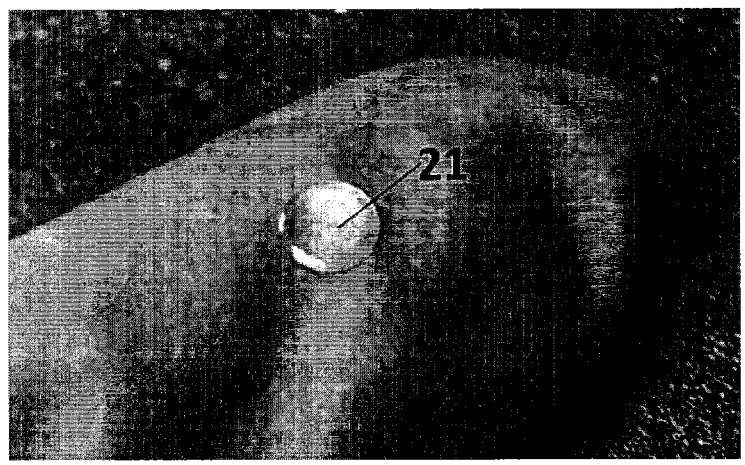
FIG. 5 is a photograph of an individual lens produced by the method of the present invention.
Figure 6:
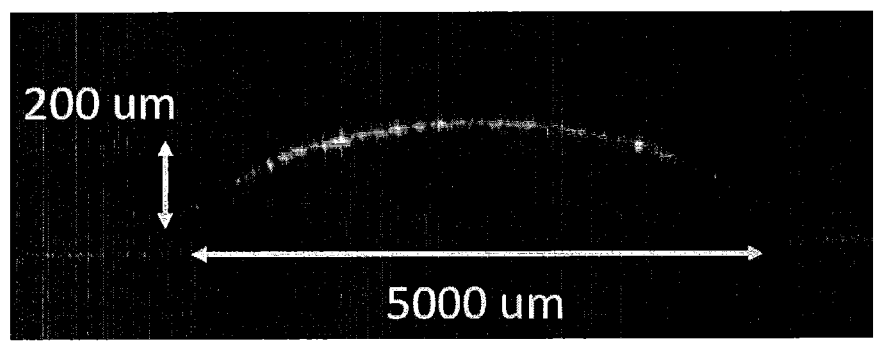
FIG. 6 is a side image of the lens of FIG. 5.

FIG. 5 is a photograph of an individual lens 21 produced by the method of the present invention, produced from the same material as the microlens array shown in FIG. 4, and FIG. 6 is a side image of the lens of FIG. 5 taken by optical coherence tomography.

Figure 7:
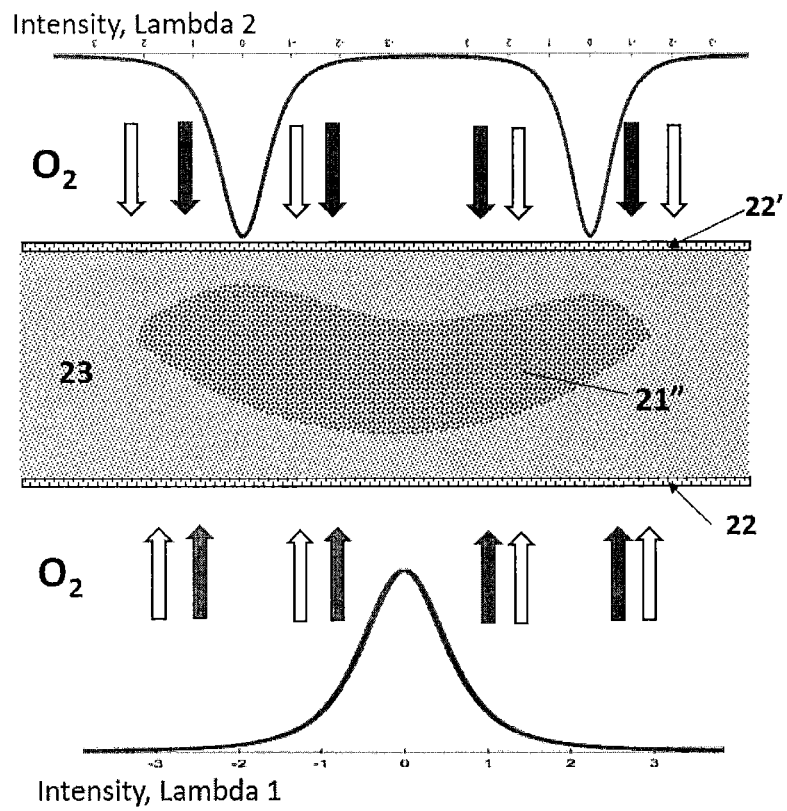
FIG. 7 schematically illustrates a second embodiment of the invention, carried out with a pair of windows.

FIG. 7 schematically illustrates a second embodiment of the invention, carried out with a pair of windows 22, 22', and a pair of light sources (not shown) Here, the carrier seen in FIGS. 1-2 is eliminated and replaced with a second window 22', with resin 23 sandwiched between the two windows 22, 22'. Light can be projected from both sides (at the same wavelength, or in some embodiments more preferably at different wavelengths), with the intensity of the light modulated differently from either side (compare upper intensity curve to lower intensity curve), to produce an object 21" that is suspended within the resin 23, and which has differently contoured surfaces on opposite sides thereof. The light may be projected concurrently, or sequentially, from the two directions. Where different wavelengths are projected from either side, they can differ by 10 or 20 nanometers, to 100 or 200 nanometers. By differing wavelengths projected from either side, their different absorption characteristics in the resin can aid in imparting a desired shape to the object 21".

Figure 8:
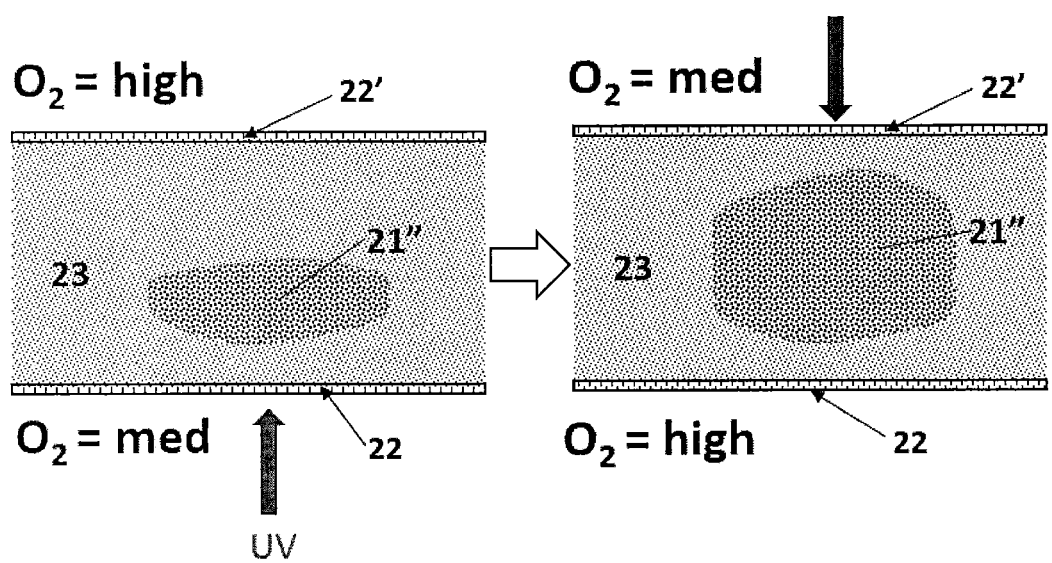
FIG. 8 schematically illustrates a third embodiment of the invention, carried out with a pair of windows.

FIG. 8 schematically illustrates a third embodiment of the invention, carried out with a pair of windows. Here, the oxygen concentration delivered through the two windows is different, with higher oxygen concentration resulting in a thicker dead zone adjacent the upper window, as shown in the left panel of FIG. 8, where light is projected through the lower window. In a subsequent step, the oxygen concentration is higher through the lower window, while light (even at the same wavelength as that projected in the previous step) is projected through the upper window, resulting in substantially inhibited polymerization beneath the object, but further growth of the object on the upper portion thereof, towards the upper window (as shown in the right panel of FIG. 8).

Figure 9:
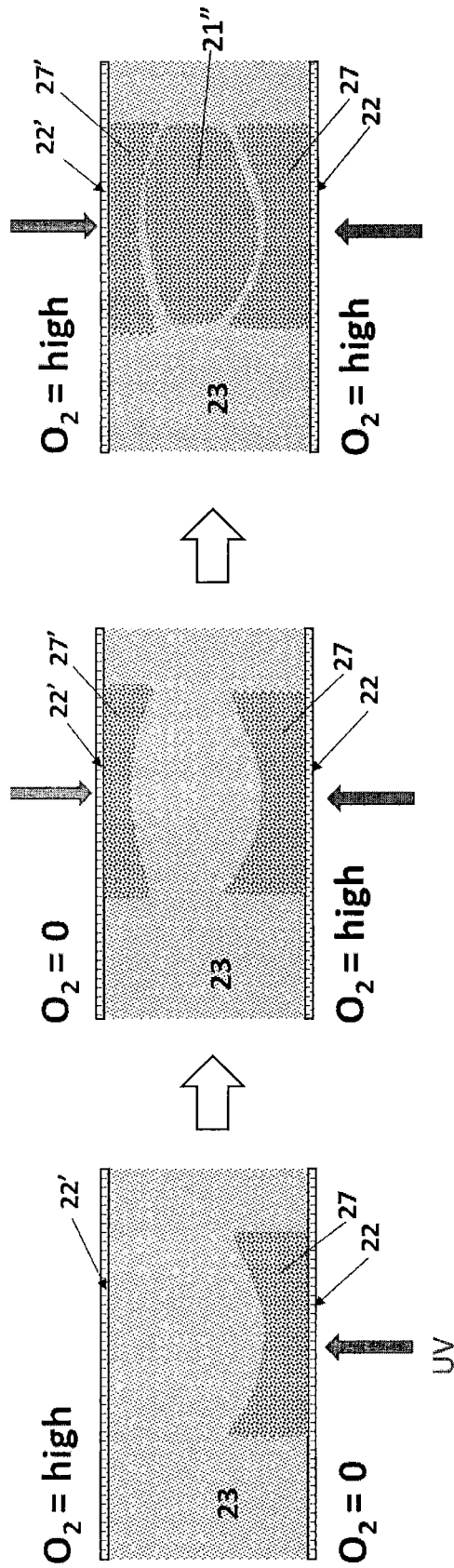
FIG. 9 schematically illustrates a fourth embodiment of the invention, carried out with a pair of windows.

FIG. 9 schematically illustrates a fourth embodiment of the invention, carried out with a pair of windows. Here, little or no oxygen is delivered through the lower window 22 in a first step, so that a pedestal or in situ mold 27 is formed on the lower window 22 by photopolymerization, with the pedestal adhered to the window, as shown in the left panel of FIG. 9. Then, as shown in the center panel of FIG. 9, a similar pedestal 27' is formed on the upper window by like technique (note the order of these steps may be reversed, or they may be carried out at the same time). Then, with oxygen being delivered through both windows, an object is 21" is formed between the two pedestals, as shown in the right panel of FIG. 9. Preferably, the pedestals are formed from a first resin that upon polymerization produces an oxygen-permeable pedestal (e.g. an elastomeric resin), which first resin is then replaced with a second resin from which the object 21" is produced. If the pedestals are too reactive (that is, if the object might adhere to them unduly when formed) then they can be photobleached prior to formation of the object. In some preferred embodiments, the object is produced from light at a different wavelength than that used to form the pedestals.

Figure 10:
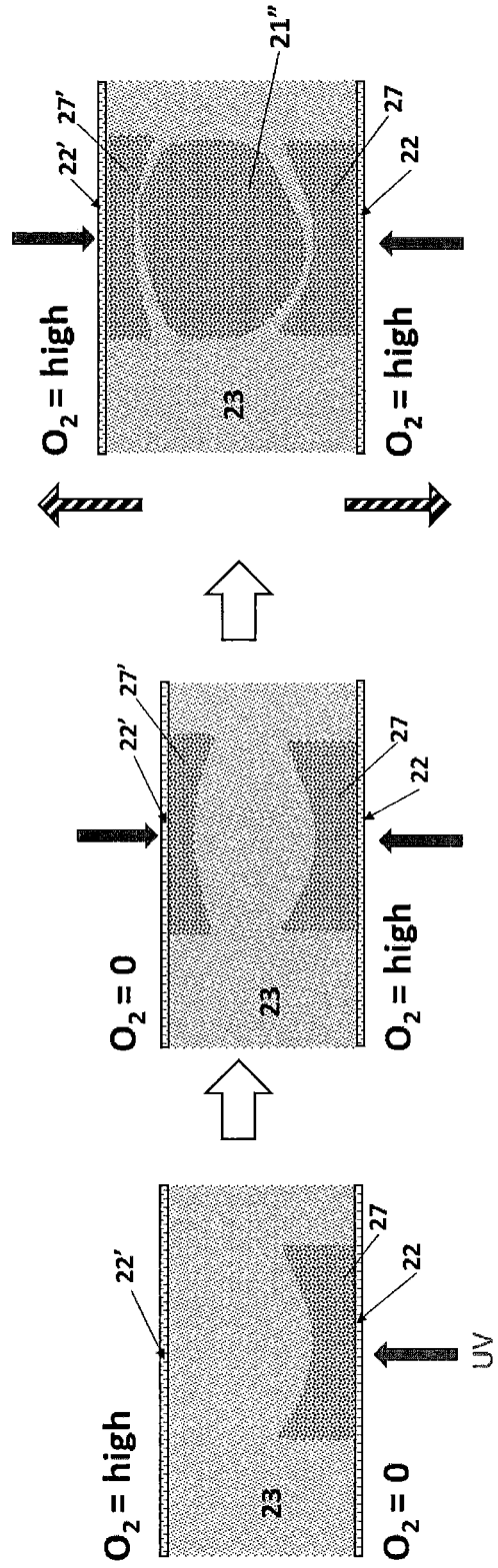
FIG. 10 schematically illustrates a fifth embodiment of the invention, carried out with a pair of windows.

FIG. 10 schematically illustrates a fifth embodiment of the invention, carried out with a pair of windows. This embodiment is similar to that of FIG. 9, except that the windows can be moved apart from one another once the pedestals are produced to provide additional space for production of a larger object 21".

Figure 11:
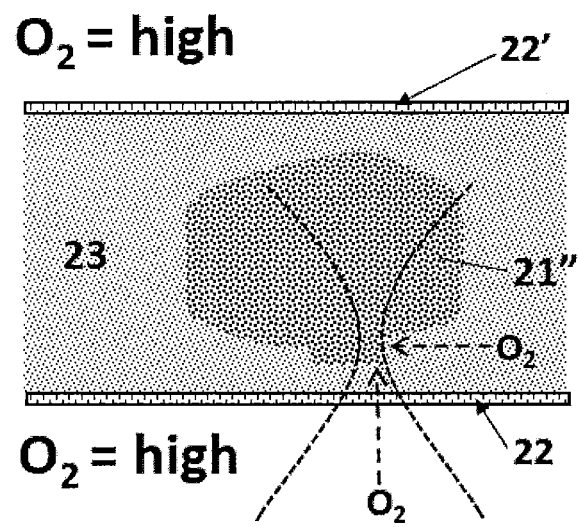
FIG. 11 schematically illustrates a sixth embodiment of the invention, in which oxygen inhibition enhances high definition resolution.

FIG. 11 schematically illustrates a sixth embodiment of the invention, in which a focused beam of light, combined with oxygen inhibition, enhances the resolution of the polymerizing step. The pair of curved dashed lines in FIG. 11 represents a focused light beam, with the focal point represented by the narrowest gap between the two dashed lines. At the focal point, when focused into the growth region on the surface of the growing three-dimensional object 21", oxygen permeating into that region from several directions—for example, from both below and from the side, as illustrated by straight dashed arrows—serves to enhance the resolution of the polymerization step.

Figure 12:
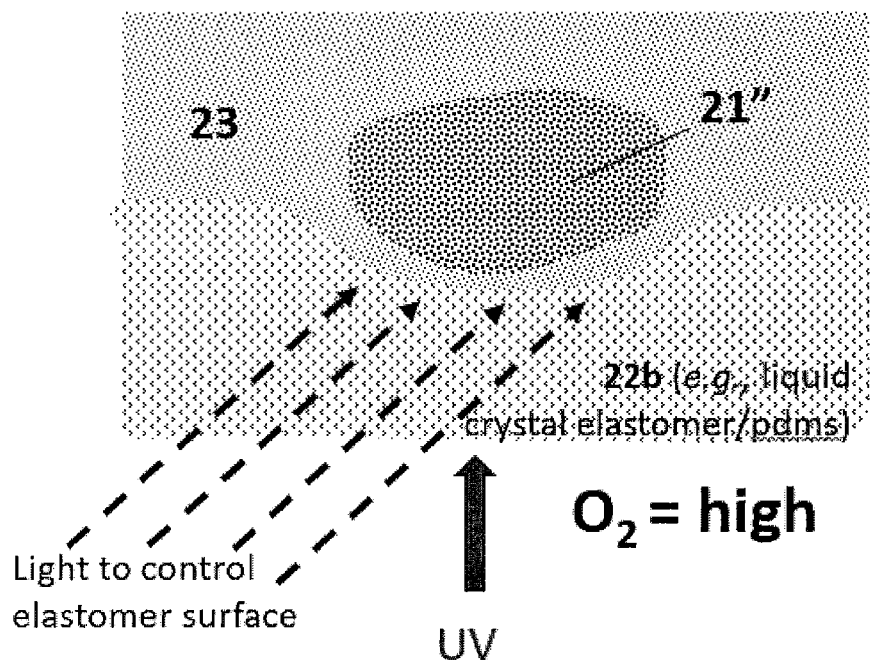
FIG. 12 schematically illustrates a seventh embodiment of the invention, in which a light controllable surface is employed.

FIG. 12 schematically illustrates a seventh embodiment of the invention, in which a light controllable surface, preferably comprised of a light-responsive polymer, is employed. In this example, a separate beam of light at a different wavelength (one that does not cause significant polymerization of the resin) is used to alter the shape of a light responsive polymer 22b that is permeable to oxygen. This serves to create a transient form, such as a well or depression, in which the object 21" can be produced. Light responsive polymers that can be used to carry out the present invention include, but are not limited to, those described in F. Nicoletta et al., *Light responsive polymer membranes: A review*, Membranes 2, 134-197 (2012). Particular examples include, but are not limited to, polymers of azobenzene monomers, such as those available from BEAM Co., 1300 Lee Road, Orlando, Fla., 32810 USA.

Figure 13:
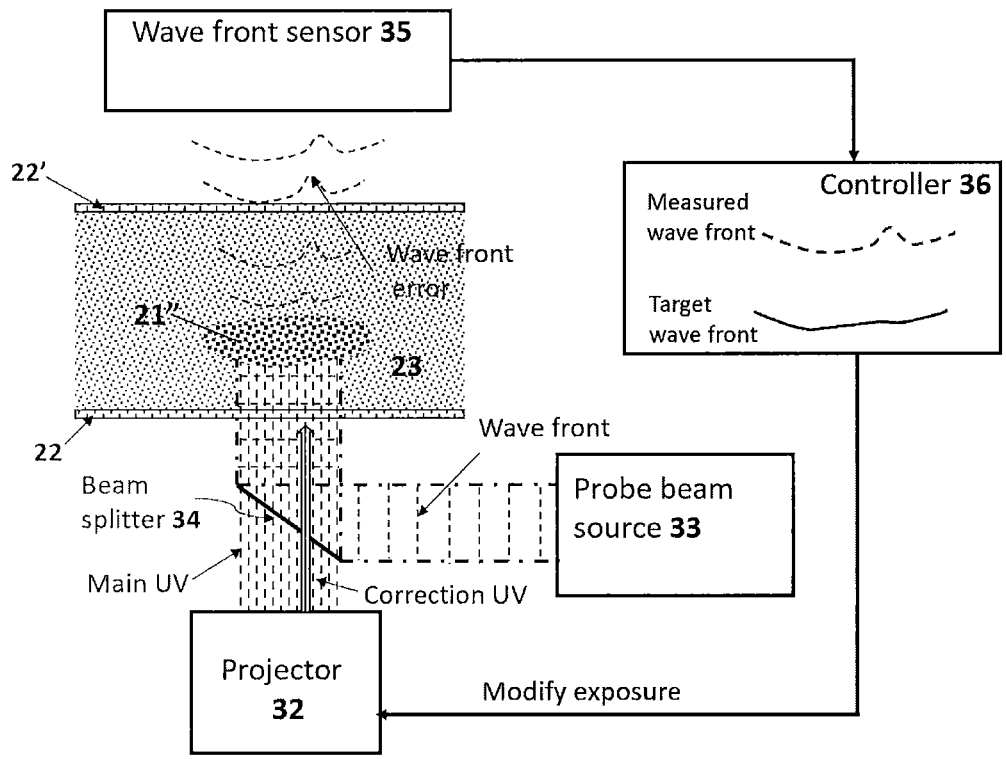
FIG. 13 schematically illustrates an eight embodiment of the invention, in which a probe beam of light is used to facilitate real-time correction of potential distortions in the object during production thereof.

FIG. 13 schematically illustrates an further embodiment of methods and apparatus of the invention, in which a probe beam of light is used to facilitate real-time correction of potential distortions in the object during production thereof. The apparatus comprises a pair of windows 22, 22' as described above, between which a resin 23 is placed, from which resin an object 21" is produced. Polymerization light is projected from a source 32, through beam splitter 34, into the resin, substantially as described above. A probe beam from a separate source (e.g., collimated light) 33 is projected onto the beam splitter 34, through the growing object 21" and to a wave front sensor 35 (for example, an interferometer, a Shack-Hartmann wavefront sensor, an optical coherence tomography apparatus, etc.) and the detected signal provided to controller 36. Deviations of the measured wave front from the target or expected wavefront are determine in the controller and used to modify the light delivered from projector 32 so as to correct structural deviations in the object 21" during production thereof.

Figure 14:
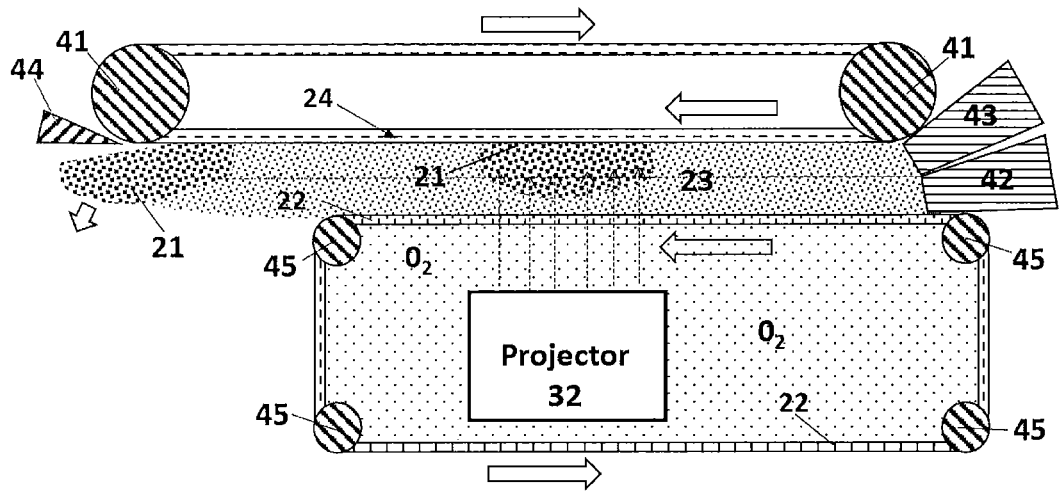
FIG. 14 schematically illustrates a further non-limiting example of an apparatus useful for carrying out the present invention.

Once produced, objects as described above can be collected by any suitable technique, such as by scraping them from a surface, washing or flushing them from a resin in which they are suspended (optionally followed by filtering or sieving them from the resin), and variations thereof. A non-limiting example of a production apparatus and method incorporating one technique for collection is given in FIG. 14, where the carrier substrate 24 and the window 22 are provided as oppositely facing, continuous, belts, mounted on drive wheels 41, 45. Resin is dispensed from one, two, or more dispensers 42, 43, into the space between the belts, and the object produced as described above. Motion of the belts may be stopped for light exposure from projector 32, the projector may travel with the belts (so that production is static), or the projected image may travel across regions of the projector, again so that the production step is static. Finished objects may be separated from the belt by peeling, by action of a blade 44, by action of an air blade or flushing assembly, etc. Unused resin 22 may be discarded or recycled. Also, when two or more dispensers 42, 43 are used, different resins may b dispensed from each thereof (as designated by the horizontal dashed line in FIG. 14) so that the object 21 may be comprised of two (or more) different materials.

The foregoing is illustrative of the present invention, and is not to be construed as limiting thereof. The invention is defined by the following claims, with equivalents of the claims to be included therein.

We claim:

1. An apparatus useful for producing at least one object having a contoured surface portion from a light polymerizable resin, said apparatus comprising:
   (a) a window containing an inhibitor of polymerization, on which window a coating of the light polymerizable resin can be placed, with said inhibitor of polymerization forming a first dead zone of unpolymerizable resin in the light polymerizable resin;
   (b) a polymerizing light source operatively associated with said window and positioned for projecting polymerizing light through said window; and
   (c) a controller operatively associated with said light source and configured to pattern and project said polymerizing light at a first light dosage sufficient to form the object in the light polymerizable resin under stationary conditions, while spatially modulating the first light dosage so that the first dead zone is spatially contoured in thickness, to produce a first contoured surface portion on each said object, which first contoured surface portion is in contact with the first dead zone of unpolymerizable resin,
   wherein the window comprises a first window, the apparatus further comprising a second window facing said first window and configured for contacting said light polymerizable resin, said second window containing said inhibitor of polymerization.

2. The apparatus of claim 1, wherein said inhibitor of polymerization comprises oxygen.

3. The apparatus of claim 1, wherein said first window comprises a fluoropolymer.

4. The apparatus of claim 1, wherein said second window comprises a fluoropolymer.

5. The apparatus of claim 1, further comprising a second polymerizing light source operatively associated with said second window and positioned for projecting polymerizing light through said second window.

6. The apparatus of claim 1, wherein said first window, and optionally said second window, comprises a light responsive polymer layer configured for contacting said light polymerizable resin.

7. The apparatus of claim 1, further comprising:
- a probe light source configured for projecting probe light through said object; and
- a detector configured for detecting said probe light having passed through said object;
- with said controller configured to modify said polymerizing light in response to deviations in said probe light from that expected to be imparted to said detector on passing through said object to correct potential distortions in said object.

8. A method of producing at least one object having a contoured surface portion, comprising:
  (a) providing a first window containing an inhibitor of polymerization,
  (b) coating said first window with a light polymerizable resin under conditions in which said inhibitor passes into a portion of said light polymerizable resin and thereby forms a first dead zone of unpolymerizable resin contacting said first window;
  (c) exposing said light polymerizable resin to patterned polymerizing light through said first window at a first light dosage sufficient to form said object in said light polymerizable resin under stationary conditions, while
  (d) spatially modulating said first light dosage so that said first dead zone is spatially contoured in thickness to produce a first contoured surface portion on each said object, which the first contoured surface portion is in contact with said first dead zone of unpolymerizable resin,
  (e) contacting a second window to said resin in a position opposing said first window, said second window containing an inhibitor of polymerization, under conditions in which said inhibitor of said second window passes into a portion of said light polymerizable resin and forms a second dead zone of unpolymerizable resin contacting said second window; and
  (f) further exposing said light polymerizable resin to patterned polymerizing light through said second window at a second light dosage sufficient to further form said object in said light polymerizable resin under stationary conditions; while
  (g) spatially modulating said second light dosage so that said second dead zone is spatially contoured in thickness to produce a second contoured surface portion on said object, which said second contoured surface portion is in contact with said second dead zone of unpolymerizable resin.

9. The method of claim 8, further comprising:
- contacting a substrate to said resin facing said first window; and
- producing said objects adhered to said substrate while said substrate and said window remain stationary; and then
- separating said objects from said substrate.

10. The method of claim 8, wherein said exposing step is carried out with:
  (i) a single pulse of patterned polymerizing light, which pulse is spatially modulated in intensity, duration, or a combination thereof, or
  (ii) a plurality of pulses of patterned polymerizing light, which pulses are spatially modulated in intensity, duration, frequency, or a combination thereof; or
  (iii) a focused beam of polymerizing light, which the focused beam is optionally focused on an edge portion of object during production thereof.

11. The method of claim 8, wherein said first window, and optionally said second window, comprises a light responsive polymer layer configured for contacting said light polymerizable resin, and optionally wherein said method further comprises exposing each said light responsive polymer layers of said first window and said second window to patterned controlling light to selectively contour the first contoured surface and the second contoured surface respectively.

12. The method of claim 8, further comprising:
- further exposing said object to probe light during said exposing step (c);
- detecting said probe light after having passed through said object; and
- modifying said polymerizing light through said first window in response to deviations in said probe light from that expected to be imparted to said detector on passing through said object to correct potential distortions in said object during said exposing step (c).

13. The method of claim 8, wherein said first window and said second window, comprise an oxygen-permeable polymer.

14. The method of claim 8, wherein said at least one object comprises a plurality of separate objects produced concurrently with one another.

15. The method of claim 8, wherein each said object comprises a lens.

16. The method of claim 8, wherein each said object comprises an optically transparent polymer.

\* \* \* \* \*